Patented Aug. 2, 1949

2,477,943

UNITED STATES PATENT OFFICE 2,477,943

MANUFACTURE OF AMINO ALCOHOLS

Correl N. Robinson, Jr., Trenton, and John F. Olin, Grosse Ile, Mich., assignors to Sharples Chemicals Inc., Philadelphia, Pa., a corporation of Delaware No Drawing. Application July 1, 1944,
Serial No. 543,214

3 Claims. (Cl. 260—584)

The present invention pertains to the manufacture of amino alcohols, and provides a process by which compounds of this type may be produced economically from aldols and aminating agents such as ammonia. The aldols treated in practice of the invention are the beta hydroxy aliphatic aldehydes obtained by condensing two molecules of the same or different simple aliphatic aldehyde or aldehydes with each other. They preferably contain from three to eight carbon atoms. It involves a process which depends in part upon the fundamental reaction discovered by Mignonac and reported in "Comptes Rendus," vol. 172, page 223.

In accordance with this general process, as developed by Mignonac and others, the aminating agent is mixed with an aldehyde or ketone in the presence of hydrogen, and the mixture is subjected to a temperature above the minimum reaction temperature at which the desired condensation reaction occurs, and below the temperature of decomposition of the desired amino alcohol. As practiced by Mignonac himself, the entire body of aldehyde or ketone was maintained in liquid phase, under the pressure of hydrogen, while being subjected to the amination reaction.

While Mignonac was primarily concerned with condensation of unsubstituted aliphatic aldehydes and ketones with aminating agents, this type of reaction has also been applied to manufacture of amino alcohols from hydroxy aldehydes. For example, according to German Patent 539,104, a mixture of ammonia and acetaldol is hydrogenated at a temperature of 50° C. and a pressure of 20 atmospheres by treatment in an autoclave with a nickel catalyst which has been carefully treated to remove all traces of alkali. By maintaining this low reaction temperature and using a very carefully treated nickel, the patentee claimed to obtain a yield of 60% of monobutanol amine and 15% of dibutanol amine.

The German patentee points out that these yields are obtained only because of the very careful treatment of the catalyst to remove all traces of alkali, and that a total conversion of only 26% was attained in otherwise comparable experiments in which this alkali removal was not first accomplished. The method of the German patent is also subject to the disadvantage that, when the order of addition of reactants therein described is observed, the temperature must be maintained exceedingly low in order to avoid degradation of the product. Temperatures as low as those practiced by the German patentee can only be maintained in the practice of his process, however, at the expense of the reaction rate. The reaction proceeds very slowly at these low temperatures, with the result that the economy in use of apparatus in practice of such a process on a commercial scale is relatively poor.

The present invention relates to a process by which all of the above-mentioned disadvantages are avoided, and excellent yields may be obtained with rapid conversion of the aminating agent, hydroxy aldehyde and hydrogen into the desired amino alcohol.

The improvement achieved by the present invention involves, in a sense, a reversal of the order of steps in this type of amination reaction. A body of aminating agent is first introduced into a reaction vessel, and that aminating agent is maintained under hydrogen pressure in liquid phase in the presence of a hydrogenating catalyst, which is preferably a hydrogenating metal, such as nickel or cobalt. The hydroxy aliphatic aldehyde to be subjected to the amination reaction is then progressively introduced into the reaction vessel and into contact with the body of aminating agent maintained therein. The temperature is maintained above the minimum temperature at which amination occurs but below the decomposition temperature of the amino alcohol to be formed. A temperature range of between 50 and 200° C. is recommended, and best results are usually obtained at temperatures between 100 and 150° C. A feature of this invention consists in the fact that, by introducing the hydroxy aldehyde gradually into the body of aminating agent, while that agent is maintained under hydrogen pressure in contact with the catalyst, the operator can obtain excellent yields and conversions at temperatures in excess of 100° C. When the order of addition observed in German Patent 539,104 is practiced, on the other hand, good yields cannot be attained at temperatures this high, and the operator must therefore use the lower temperatures taught in that patent, with the disadvantage of the low rate of reaction attainable at these low temperatures.

In the practice of the present invention, we prefer to introduce the hydroxy aldehyde into contact with the body of aminating agent, hydrogen and catalyst at a rate which does not greatly exceed the rate of reaction of the aldehyde with the aminating agent and hydrogen to form the desired amino alcohol, and this introduction rate is preferably maintained at approximately the rate of reaction. In order to get high yields and rapid reaction it is important that the hydrogen as well as the aminating agent be present as the aldol is gradually introduced. We also prefer to maintain, in the reaction vessel, a body of aminating agent which represents a large molecular excess with respect to the aldehyde to be condensed therewith. In most cases, it will be desirable to maintain a stoichiometric excess of between 2:1 and 20:1 of the aminating agent. This insures a large molecular excess of the aminating agent at all times during the course of the reaction.

In the practice of the invention, a solvent, such as methanol, a higher alcohol, or water, is preferably employed. The solvent is placed in a hydrogenation autoclave, together with the hydrogenation catalyst and the aminating agent, namely, ammonia. Hydrogen is introduced until a substantial hydrogen pressure (300 pounds per square inch) is developed, and the reaction mixture is agitated and heat applied. When the desired reaction temperature (between 50 and 200° C., but preferably between 100 and 150° C.) has been reached, the hydroxy aldehyde, preferably dissolved in one of the solvents mentioned above, is slowly pumped in during continued agitation. Hydrogen is added as needed, and the pressure usually ranges between 600 and 1500 pounds per square inch during the course of the reaction. After all the aldehyde has been added, stirring and temperature control are continued until absorption of the hydrogen is complete (usually from 10 to 20 minutes). The crude reaction mixture is then subjected to distillation to obtain the desired amino alcohol.

The preferred catalyst is nickel in finely divided form, and best results are obtained when between 1 and 10% (based on the hydroxy aldehyde) of this type of catalyst is used. It is not necessary to take the precaution of removing all alkali from the catalyst in practice of the present invention, as is done in German Patent 539,104.

*Example I*

1 liter of methanol, 50 grams of nickel hydrogenation catalyst and 80 moles of ammonia were placed in a hydrogenation autoclave equipped with an efficient mixer. Hydrogen was introduced until the pressure reached 400 pounds per square inch, the autoclave was heated to 125° C. and the contents stirred during the heating. 8 moles (704 grams) of acetaldol dissolved in 1 liter of solvent (15% water—85% methanol) were slowly added by means of a pump over a period of 35 minutes. Hydrogen was added as needed, the total pressure ranging between 800 and 1400 pounds per square inch. Stirring and temperature control were maintained until absorption of hydrogen was complete (about 15 minutes). The crude material was distilled and 433 grams of 4-amino-butanol-2 (a 61% conversion) were obtained, with only 30 grams of high boiling residual material.

*Example II*

In this example, instead of practicing the order of addition of reactants constituting the subject matter of the present invention, the order employed by Mignonac was used. 2 liters of solvent (7.5% water—92.5% methanol), 50 grams of a nickel catalyst like that used in Example I, and 8 moles (704 grams) of acetaldol were placed in an autoclave. 80 moles of ammonia (1360 grams) were then added and hydrogen was introduced until the pressure reached 400 pounds per square inch. Heating and stirring was commenced, and noticeable hydrogenation began at 100° C. and became quite rapid at 137–140° C. The pressure ranged from 600 to 1000 pounds per square inch during the run. Upon distillation, 188 grams of 4-amino-butanol-2 (a 26% conversion) were obtained, along with 60 grams of high boiling residue.

By comparison of Examples I and II, which are typical of our best efforts to obtain good yields and conversions by these respective procedures, it will be seen that the yield of the desired amino alcohol is more than doubled by practice of the present invention.

Various modifications are possible within the scope of the invention, and we do not therefore wish to be limited except by the scope of the following claims.

We claim:

1. In the manufacture of amino alcohols by condensing an aldol with an aminating agent and hydrogen, the process comprising introducing a body of ammonia into a reaction vessel and maintaining the ammonia under hydrogen pressure in liquid phase in the presence of a hydrogenating catalyst, and introducing the aldol progressively into said body of ammonia while said ammonia is maintained in liquid phase under hydrogen pressure at a temperature above the minimum temperature at which amination occurs but below the decomposition temperature of the amino alcohol to be formed.

2. In the manufacture of amino alcohols by condensing an aldol containing between 3 and 8 carbon atoms with an aminating agent and hydrogen, the process comprising introducing a body of ammonia into a reaction vessel and maintaining the ammonia under hydrogen pressure in liquid phase in the presence of a hydrogenating catalyst, and introducing the aldol progressively into said body of ammonia while said ammonia is maintained in liquid phase under hydrogen pressure at a temperature above the minimum temperature at which amination occurs but below the decomposition temperature of the amino alcohol to be formed.

3. In a manufacture of 4-amino-butanol-2 by condensing acetaldol with ammonia, the process comprising introducing a body of ammonia into a reaction vessel and maintaining that ammonia under hydrogen pressure in liquid phase in the presence of a hydrogenating catalyst, and introducing the acetaldol progressively into said body of ammonia while said ammonia is maintained in liquid phase under hydrogen pressure at a temperature above the minimum temperature at which amination occurs but below the decomposition temperature of the 4-amino-butanol-2 to be formed.

CORREL N. ROBINSON, JR.
JOHN F. OLIN.

REFERENCES CITED

The following references are of record in the file of this patent:

FOREIGN PATENTS

| Number | Country | Date |
|---|---|---|
| 313,617 | Great Britain | July 24, 1930 |
| 539,104 | Germany | Nov. 21, 1931 |